United States Patent
Wang et al.

(10) Patent No.: US 10,637,653 B2
(45) Date of Patent: Apr. 28, 2020

(54) SYSTEM AND METHOD FOR ESTABLISHING SHARE KEY IN COMPUTING-RESOURCE-ASYMMETRIC FIELD

(71) Applicant: WUHAN UNIVERSITY, Wuhan (CN)

(72) Inventors: Houzhen Wang, Wuhan (CN); Huanguo Zhang, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 232 days.

(21) Appl. No.: 15/869,110

(22) Filed: Jan. 12, 2018

(65) Prior Publication Data

US 2019/0132121 A1  May 2, 2019

(30) Foreign Application Priority Data

Oct. 27, 2017 (CN) .......................... 2017 1 1024800

(51) Int. Cl.
*H04L 9/08* (2006.01)
*G06F 7/58* (2006.01)
*H04L 9/14* (2006.01)

(52) U.S. Cl.
CPC .............. *H04L 9/0825* (2013.01); *G06F 7/58* (2013.01); *H04L 9/0838* (2013.01); *H04L 9/0841* (2013.01); *H04L 9/14* (2013.01)

(58) Field of Classification Search
CPC ... H04L 9/0825; H04L 9/0838; H04L 9/0841; H04L 9/14; H04L 9/0869; H04L 9/0863; H04L 9/085; G06F 7/58
See application file for complete search history.

(56) References Cited

U.S. PATENT DOCUMENTS 8,782,491 B2 * 7/2014 Resch .................... H04L 9/085
                                                          714/764
9,509,492 B2 * 11/2016 Smyth .................... H04L 9/008
(Continued)

OTHER PUBLICATIONS

"18.783 Elliptic Curves", Feb. 22, 2017, MIT OpenCourseWare, Lecture #5, p. 1-11.*
(Continued)

*Primary Examiner* — Christopher A Revak
(74) *Attorney, Agent, or Firm* — Matthias Scholl P.C.; Matthias Scholl

(57) ABSTRACT

A system for establishing a shared key in a computing-resource-asymmetric field. The system includes: a first communicating unit configured to transmit an interaction request and interaction information of a first user to a second user, and receive interaction information from the second user; a first random number generator configured to generate a random number; a first memory configured to store private key information and public key information of the first user and the interaction information; a first processor configured to complete a computing demand of the first user; a second communicating unit configured to receive the interaction request and the interaction information from the first user, and transmit the interaction information to the first user; a second random number generator configured to generate a random number; a second memory configured to store private key information of the second user and the interaction information; and a second processor.

2 Claims, 4 Drawing Sheets

(56) References Cited

U.S. PATENT DOCUMENTS

| | | | | |
|---|---|---|---|---|
| 2004/0111615 | A1* | 6/2004 | Nyang | H04L 9/0844 713/168 |
| 2010/0058059 | A1* | 3/2010 | Schneider | H04L 9/3026 713/171 |
| 2011/0255687 | A1* | 10/2011 | Farrugia | H04L 9/3013 380/28 |
| 2012/0100833 | A1* | 4/2012 | Gao | H04L 9/0844 455/411 |
| 2017/0208062 | A1* | 7/2017 | Morikawa | H04L 9/0841 |
| 2017/0359318 | A1* | 12/2017 | Wei | H04L 9/14 |
| 2018/0331829 | A1* | 11/2018 | Wang | H04L 9/0844 |

OTHER PUBLICATIONS

Barak, "Lecture 17—Diffie Hellman key exchange, pairing, Identity-Based Encryption and Forward Security", Nov. 21, 2007, p. 1-7.*

* cited by examiner

SYSTEM AND METHOD FOR ESTABLISHING SHARE KEY IN COMPUTING-RESOURCE-ASYMMETRIC FIELD

CROSS-REFERENCE TO RELATED APPLICATIONS

Pursuant to 35 U.S.C. § 119 and the Paris Convention Treaty, this application claims the benefit of Chinese Patent Application No. 201711024800.7 filed Oct. 27, 2017, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The disclosure belongs to the field of information security technology, and in particular, to a system and a method for establishing a shared key in a computing-resource-asymmetric field.

Description of the Related Art

A conventional public key cryptosystem has at least the following two disadvantages:

(1) Compared with a symmetric cipher, the public key cryptosystem is designed based on mathematical difficulties, and implemented at a low efficiency.

(2) In terms of algorithm, a difference between implementation environments is not taken into consideration. For example, for the typical Diffie-Hellman key exchange protocol, both protocol parties consume same computing resources during implementation of the protocol, that is, each of the parties needs to perform large integer modular exponentiation twice.

At the present, a number of application fields such as the Internet of Things and cloud computing are characterized by asymmetric computing resources, that is, a server has much more computing resources than a terminal.

SUMMARY OF THE INVENTION

In view of the above-described problems, one objective of the disclosure is to provide a system and a method for establishing a shared key in a computing-resource-asymmetric field.

To achieve the above objectives, in accordance with one embodiment of the invention, there is provided a system for establishing a shared key in a computing-resource-asymmetric field, the system comprising:

- a first communicating unit configured to transmit an interaction request and interaction information of a first user to a second user, and receive interaction information from the second user;
- a first random number generator configured to generate a random number required by the first user;
- a first memory configured to store private key information and public key information of the first user and the interaction information transmitted by the second user;
- a first processor configured to complete a computing demand of the first user;
- a second communicating unit configured to receive the interaction request and the interaction information from the first user, and transmit the interaction information to the first user;
- a second random number generator configured to generate a random number required by the second user;
- a second memory configured to store private key information of the second user and the interaction information transmitted by the first user; and
- a second processor configured to complete a computing demand of the second user.

Computing by both the first user and the second user is performed in a cyclic group $\mathbb{G}=\{1, 2, \ldots, p-1\}$, where p is a prime number; and a method for establishing a shared key by the first user and the second user comprises:

(1) randomly selecting, by the first user, n values $y_1, \ldots, y_n \in \mathbb{G}$ and randomly and evenly selecting a non-empty set $S \subset \{1, 2, \ldots, n\}$ by using the first random number generator, and storing the S in the first memory as a temporary private key of the first user; and then computing $K_A = \Pi_{i \in S} y_i$ by using the first processor;

(2) transmitting, by the first user, $y_1, \ldots, y_n$, $K_A$ and the interaction request to the second user by using the first communicating unit;

(3) randomly selecting, by the second user, $b \in \mathbb{G}$ by using the second random number generator after receiving the interaction request and the interaction information of the first user, computing a shared key $K_{AB} = K_A^b$ by using the second processor, and storing $K_{AB} = K_A^b$ in the second memory; and then computing $y_1^b, \ldots, y_n^b$ by using the second processor, and transmitting $y_1^b, \ldots, y_n^b$ to the first user by using the second communicating unit; and (4) invoking, by the first user, the private key S of the first user from the first memory after receiving $y_1^b, \ldots, y_n^b$, and then computing a shared key $K_{BA} = \Pi_{i \in S} y_i^b$ by using the first processor, and storing $K_{BA} = \Pi_{i \in S} y_i^b$ in the first memory.

With the above four blocks, the first user and the second user obtain a shared key $K = K_{AB} = K_{BA}$ by negotiation.

In another aspect, there provided is a method for establishing a shared key by the first user and the second user, in which the computing by both the first user and the second user is performed in a cyclic group $\mathbb{G}$ formed by a set of points on an elliptic curve; and the method comprises:

(1) randomly selecting, by the first user, n points $(x_1, y_1), \ldots, (x_n, y_n) \in \mathbb{E}$ and randomly and evenly selecting a non-empty set $S \subset \{1, 2, \ldots, n\}$ by using the first random number generator, and storing the S in the first memory as a temporary private key of the first user; and then computing $K_A = \Sigma_{i \in S}(x_i, y_i)$ by using the first processor;

(2) transmitting, by the first user, $(x_1, y_1), \ldots, (x_n, y_n)$, $K_A$ and the interaction request to the second user by using the first communicating unit;

(3) randomly selecting, by the second user, $b \in \mathbb{G}$ by using the second random number generator after receiving the interaction request and the interaction information of the first user, computing a shared key $K_{AB} = bK_A$ by using the second processor, and storing $K_{AB} = bK_A$ in the second memory; and then computing $b(x_1, y_1), \ldots, b(x_n, y_n)$ by using the second processor, and transmitting $b(x_1, y_1), \ldots, b(x_n, y_n)$ to the first user by using the second communicating unit; and (4) invoking, by the first user, the private key S of the first user from the first memory after receiving $b(x_1, y_1), \ldots, (x_n, y_n)$, and then computing a shared key $K_{BA} = \Sigma_{i \in S} b(x_i, y_i)$ by using the first processor, and storing $K_{BA} = \Sigma_{i \in S} b(x_i, y_i)$ in the first memory.

With the above four blocks, the first user and the second user obtain a shared key $K = K_{AB} = K_{BA}$ by negotiation.

The disclosure has the following advantages and benefits: computing resources required by both protocol parties during an implementation are asymmetric, which greatly improves the implementation efficiency of a protocol party. The disclosure is particularly applicable to security fields such as the Internet of Things and cloud computing where computing resources of a server and a mobile terminal are asymmetric, and has advantages in these fields over a conventional key exchange protocol such as the Diffie-Hellman key exchange protocol.

DETAILED DESCRIPTION OF THE EMBODIMENTS

To facilitate the understanding and implementation of the disclosures by persons of ordinary skill in the art, the disclosure will be further described in detail below with reference to the accompanying drawings and examples. It should be understood that examples described herein are merely used for illustrating and explaining the disclosure rather than limiting the disclosure.

Figure 1:
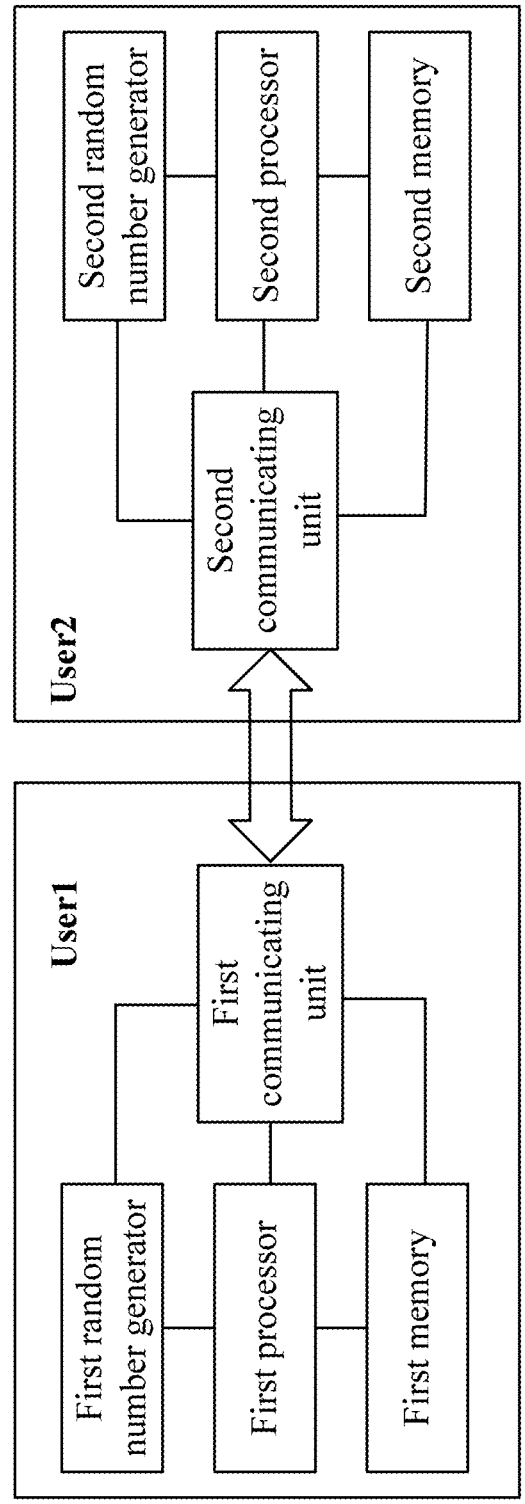
FIG. 1 is a flowchart of device and working environment of establishing a shared key.
Figure 2:
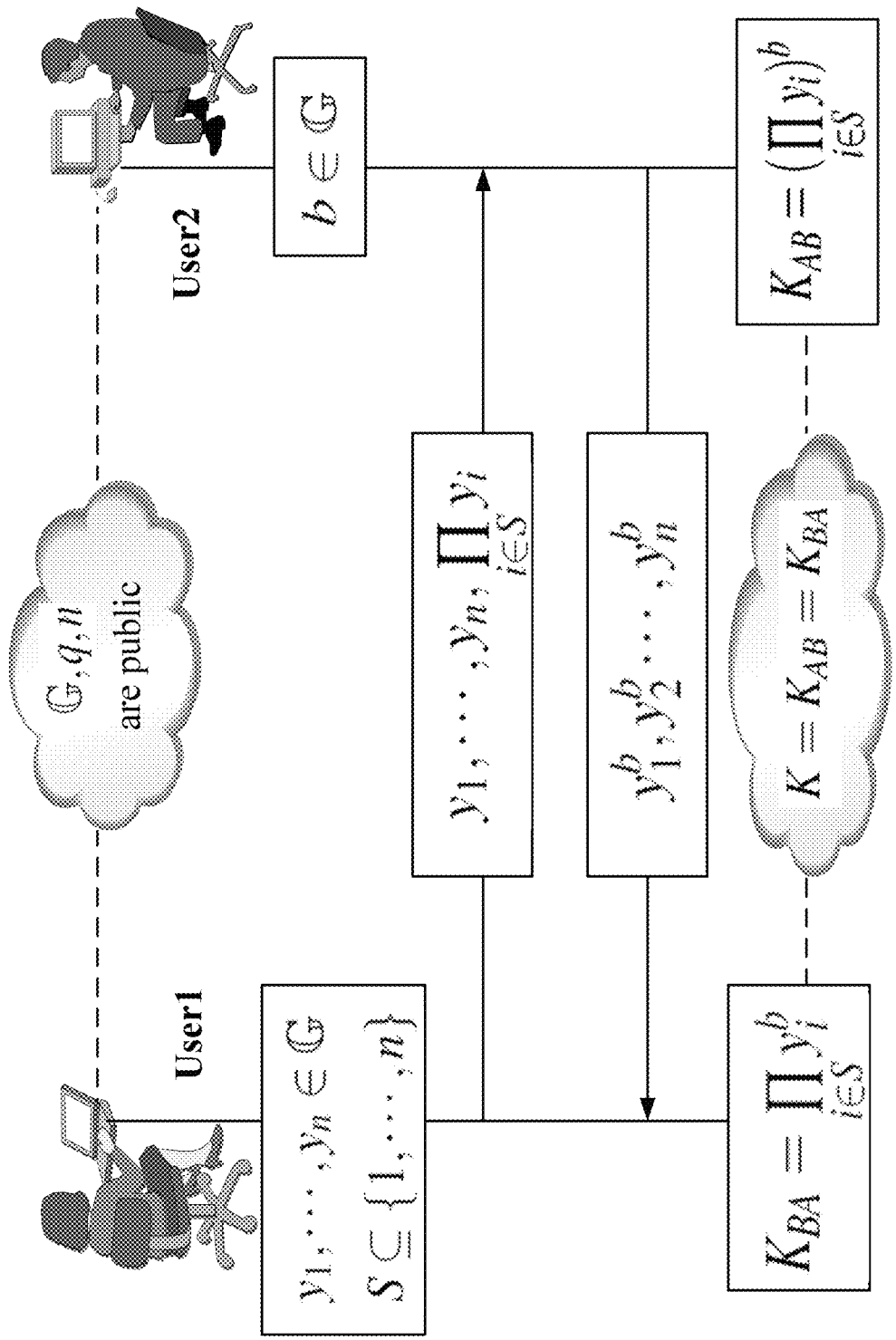
FIG. 2 is a flowchart based on integer cyclic group illustrating a method for establishing a shared key.
Figure 3:
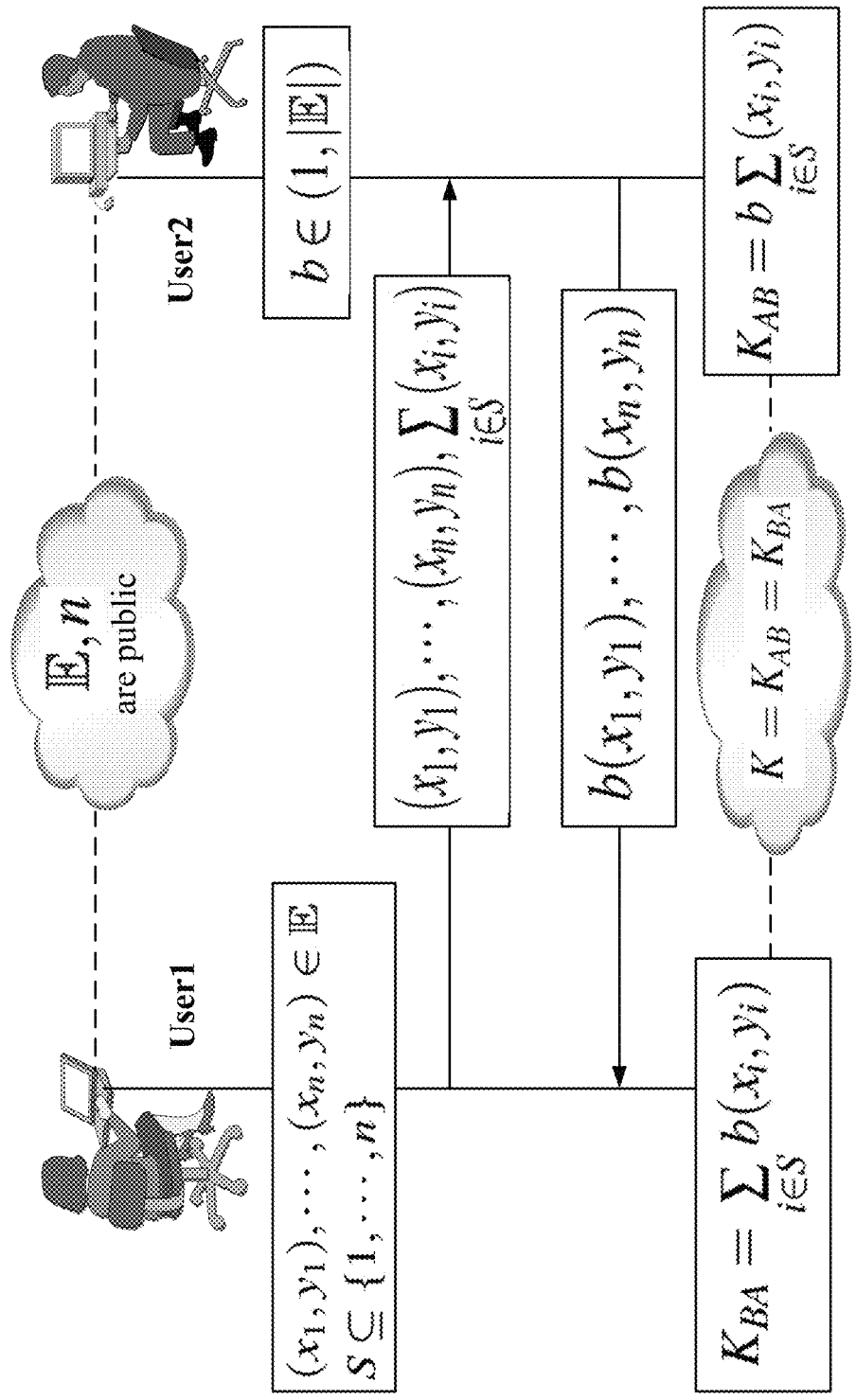
FIG. 3 is a flowchart based on the elliptic curve circular point group illustrating a method for establishing a shared key.
Figure 4:
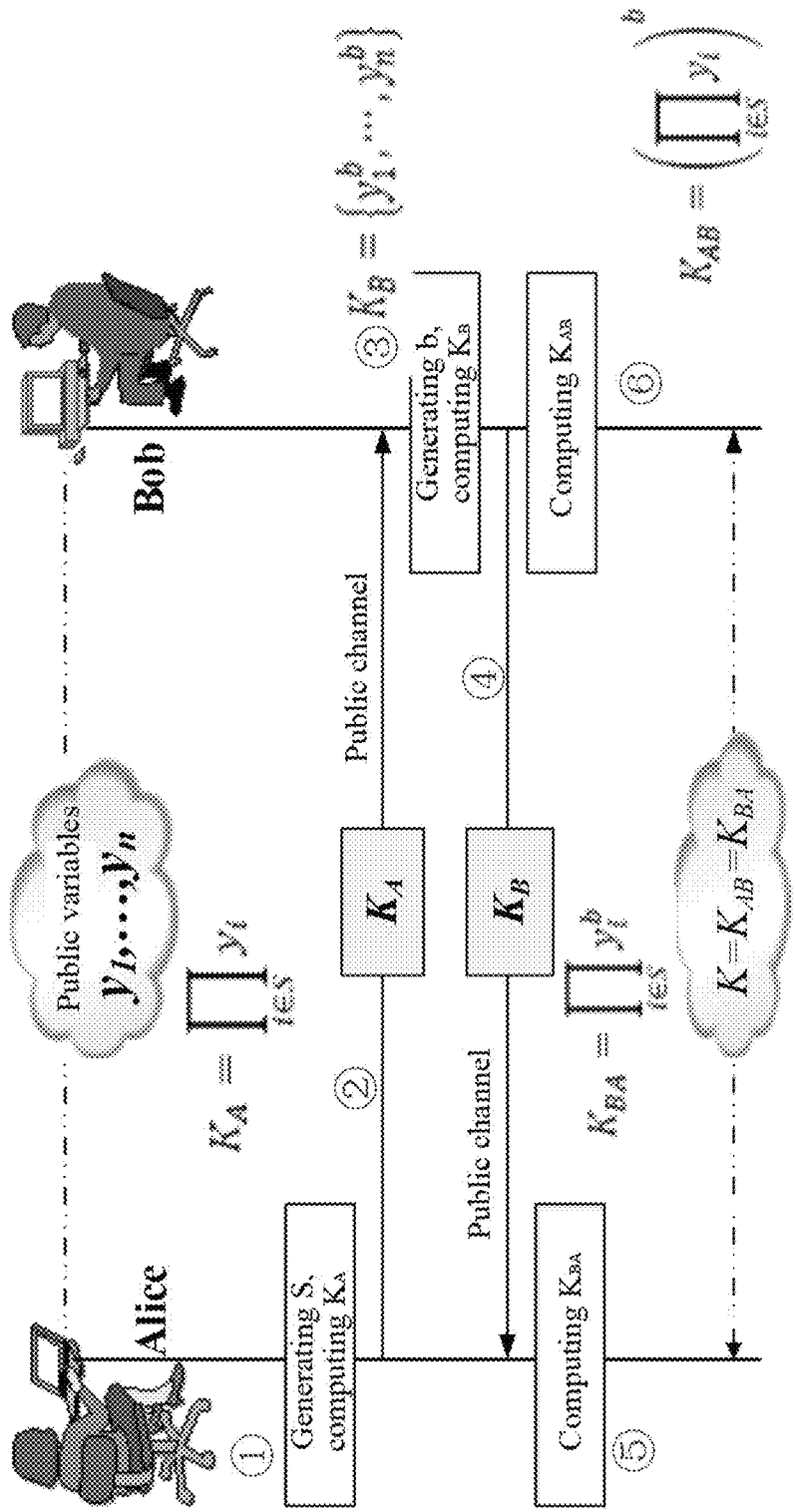
FIG. 4 is a flowchart illustrating a method for establishing a shared key in a computing-resource-asymmetric field according to an example of the disclosure.

FIGS. 1-4 are flowcharts illustrating a method for establishing a shared key in a computing-resource-asymmetric field according to examples of the disclosure. Assuming that communication parties are Bob and Alice, establishing a shared key by the both communication parties includes the following blocks:

At block 1: a system is established.

A cyclic group $\mathbb{G}$ is selected first, and then n values $y_1, \ldots, y_n \in \mathbb{G}$ are randomly selected and then a public parameter of a system is $\{\mathbb{G}, y_1, \ldots, y_n\}$.

At block 2: Alice randomly and evenly selects a set $S \subset \{1, 2, \ldots, n\}$, uses S as her temporary private key, and then computes $K_A = \Pi_{i \in S} y_i$.

At block 3: Alice transmits $K_A$ to Bob over a public channel.

At block 4: Bob randomly selects $b \in \mathbb{G}$ and sequentially computes $y_1^b, \ldots, y_n^b$.

At block 5: Bob transmits $K_B = \{y_1^b, \ldots, y_n^b\}$ to Alice over a public channel.

At block 6: Alice computes a shared key $K_{BA} = \Pi_{i \in S} y_i^b$ by using her private key S after receiving the $K_B$.

At block 7: Bob computes a shared key $K_{AB} = (\Pi_{i \in S} y_i)^b$ by using his private key b after receiving the $K_A$.

Computing in block 2, block 4, block 6, and block 7 is performed in the cyclic group $\mathbb{G}$.

The disclosure further provides a method for establishing a shared key in a computing-resource-asymmetric field. Assuming that both communication parties are Bob and Alice, establishing a shared key by the both communication parties includes the following blocks:

At block 1: a system is established.

A cyclic group $\mathbb{E}$ formed by a set of points on an elliptic curve is selected, and then n points $(x_1, y_1), \ldots, (x_n, y_n) \in \mathbb{E}$ are randomly selected. Then a public parameter of a system is $\{\mathbb{E}, (x_1, y_1), \ldots, (x_n, y_n)\}$.

At block 2: Alice randomly and evenly selects a set $S \subset \{1, 2, \ldots, n\}$, uses S as her temporary private key, and then computes $K_A = \Sigma_{i \in S}(x_i, y_i)$.

At block 3: Alice transmits $K_A$ to Bob over a public channel.

At block 4: Bob randomly selects $b \in \mathbb{E}$ and computes $b(x_1, y_1), \ldots, b(x_n, y_n)$, where $b(x_i, y_i)$ represents a point multiplication operation of an elliptic curve.

At block 5: Bob transmits $K_B = \{b(x_1, y_1), \ldots, b(x_n, y_n)\}$ to Alice over a public channel.

At block 6: Alice computes a shared key $K_{BA} = \Sigma_{i \in S} b(x_i, y_i)$ by using her private key S after receiving the $K_B$.

At block 7: Bob computes a shared key $K_{AB} = b \Sigma_{i \in S}(x_i, y_i)$ by using his private key b after receiving the $K_A$.

Computing in block 2, block 4, block 6, and block 7 is performed in the cyclic group $\mathbb{E}$.

It should be understood that, parts which are not elaborated in this disclosure belong to the prior art.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of establishing a shared key by a first user and a second user, the first user and the second user performing computing in a cyclic group $\mathbb{G} = \{1, 2, \ldots, p-1\}$, p is a prime number, and the method comprising:

(1) randomly selecting, by the first user, n values $y_1, \ldots, y_n \in \mathbb{G}$ and randomly and evenly selecting a non-empty set $S \subset \{1, 2, \ldots, n\}$ by using a first random number generator, and storing the S in a first memory as a temporary private key of the first user; and then computing $K_A = \Pi_{i \in S} y_i$ by using a first processor;

(2) transmitting, by the first user, $y_1, \ldots, y_n, K_A$ and an interaction request to the second user by using a first communicating unit;

(3) randomly selecting, by the second user, $b \in \mathbb{G}$ by using a second random number generator after receiving the interaction request and the interaction information of the first user, computing a shared key $K_{AB} = K_A^b$ by using a second processor, and storing $K_{AB} = K_A^b$ in a second memory; and then computing $y_1^b, \ldots, y_n^b$ by using the second processor, and transmitting $y_1^b, \ldots, y_n^b$ to the first user by using a second communicating unit; and (4) invoking, by the first user, the private key S of the first user from the first memory after receiving $y_1^b, \ldots, y_n^b$, and then computing a shared key $K_{BA}=\Pi_{i\in S}y_i^b$ by using the first processor, and storing $K_{BA}=\Pi_{i\in S}y_i^b$ in the first memory.

2. A method of establishing a shared key by a first user and a second user, the first user and the second user performing computing in a cyclic group $\mathbb{E}$ formed by a set of points on an elliptic curve, and the method comprising:

(1) randomly selecting, by the first user, n points $(x_1, y_1), \ldots, (x_n, y_n)\in\mathbb{E}$ and randomly and evenly selecting a non-empty set $S\subset\{1, 2, \ldots, n\}$ by using a first random number generator, and storing the S in a first memory as a temporary private key of the first user; and then computing $K_A=\Sigma_{i\in S}(x_i,y_i)$ by using a first processor;

(2) transmitting, by the first user, $(x_1, y_1), \ldots, (x_n, y_n)$, $K_A$ and an interaction request to the second user by using a first communicating unit;

(3) randomly selecting, by the second user, $b\in\mathbb{G}$ by using a second random number generator after receiving the interaction request and the interaction information of the first user, computing a shared key $K_{AB}=bK_A$ by using a second processor, and storing $K_{AB}=bK_A$ in a second memory; and then computing $b(x_1, y_1), \ldots, b(x_n, y_n)$ by using the second processor, and transmitting $b(x_1, y_1), \ldots, b(x_n, y_n)$ to the first user by using a second communicating unit; and (4) invoking, by the first user, the private key S of the first user from the first memory after receiving $b(x_1, y_1), \ldots, b(x_n, y_n)$, and then computing a shared key $K_{BA}=\Sigma_{i\in S}b(x_i,y_i)$ by using the first processor, and storing $K_{BA}=\Sigma_{i\in S}b(x_i,y_i)$ in the first memory.

* * * * *